United States Patent [19]

Roe

[11] Patent Number: 5,302,308
[45] Date of Patent: Apr. 12, 1994

[54] METHODS FOR CONTROLLING DUST IN HIGH TEMPERATURE SYSTEMS

[75] Inventor: Donald C. Roe, Tabernacle, N.J.

[73] Assignee: Betz Laboratories, Inc., Trevose, Pa.

[21] Appl. No.: 934,835

[22] Filed: Aug. 24, 1992

[51] Int. Cl.$^5$ .......................... C09K 3/22; C10L 10/00
[52] U.S. Cl. .......................... 252/88; 44/640; 44/602
[58] Field of Search .................. 252/88; 44/640, 602

[56] References Cited

U.S. PATENT DOCUMENTS

| | | | |
|---|---|---|---|
| 4,171,276 | 10/1979 | Brehm | 252/88 |
| 4,316,811 | 2/1982 | Burns et al. | 252/88 |
| 4,380,459 | 4/1983 | Netting | 252/88 |
| 4,650,598 | 3/1987 | Roberts et al. | 252/88 |
| 4,746,543 | 5/1988 | Zinkan et al. | 427/136 |
| 4,780,143 | 10/1988 | Roe | 106/102 |
| 4,801,635 | 1/1989 | Zinkan et al. | 524/156 |
| 4,971,720 | 11/1990 | Roe | 252/88 |

OTHER PUBLICATIONS

McCutcheon's Functional Materials 1983 p. 238.

*Primary Examiner*—Prince Willis, Jr.
*Assistant Examiner*—J. Silbermann
*Attorney, Agent, or Firm*—Alexander D. Ricci; Philip H. Von Neida

[57] ABSTRACT

Method for inhibiting dust emissions from hot (>120° F.) substrates are provided for. The method comprise adding to the substrate an aqueous solution or formed solution of polyethylene oxide or a polyethylene oxide derivative.

11 Claims, No Drawings

METHODS FOR CONTROLLING DUST IN HIGH TEMPERATURE SYSTEMS

FIELD OF THE INVENTION

The invention pertains to improved methods for reducing the dustiness of hot particulate solids.

BACKGROUND OF THE INVENTION

Dust control, as used herein, is defined as the prevention or reduction of the extent to which fine particulates become airborne or suspended in air. Dust is generated in significant quantities during the mining, handling, transportation, and storage of coal; dust is also generated during the processing, transportation and handling of rock, green and calcined petroleum coke, ores (for example iron ore), grains, limestone, gypsum, fly ash, cement clinker, bauxite and fertilizers (such as potash and phosphates), among others. Road dust also proves to be a problem.

Industrial sources of fugitive dust include open operations, leaks and spills, storage, disposal, transit or poor housekeeping of sundry finely divided solid particulates. The iron and steel industries are replete with examples of the above enumerated categories. Wind erosion of exposed masses of particulate matter such as coal or mine mill tailings, fertilizer, etc., causes both air pollution and economic waste. Detrimental effects on health and cleanliness result where these fine particles are carried aloft by the winds.

Hot substrates (>120° F.) pose a more difficult problem for controlling dust emissions than substrates at ambient temperatures. Water is typically used as the primary active and distribution medium for dust control at ambient temperatures. However, at elevated temperatures, water evaporates quickly, and loses effectiveness at controlling dust emissions.

SUMMARY OF THE INVENTION

The instant invention pertains to methods for reducing dust emissions from hot particulate solids. Polyethylene oxide and its derivatives in aqueous solutions provide high temperature dust control. These solutions are applied either as a liquid spray or as an aqueous foam.

DESCRIPTION OF THE RELATED ART

A foamed dust control agent is employed in U.S. Pat. No. 4,780,143, Roe, to suppress dust generation from cement clinker. The foam contains an antifoaming agent which acts to inhibit foam formation in the slurried cement.

U.S. Pat. No. 4,801,635, Zinkan et al., teaches an aqueous solution for dust control. This solution comprises a water-soluble anionic acrylic polymer, a water-soluble nonionic alkylene glycol polymer, a water-soluble nonionic polyalkoxy alcohol surfactant, a water-soluble anionic surfactant and a sequestering agent.

Zinkan et al., U.S. Pat. No. 4,746,543, teaches a method of controlling dust utilizing the compositions as taught in the Zinkan '635 patent.

DETAILED DESCRIPTION OF THE INVENTION

The present invention relates to methods for reducing dust emissions from hot particulate solids comprising adding to said solids a dust inhibiting amount of a polyethylene oxide derivative compound.

The polyethylene oxide compounds generally have the formula $$R-(CH_2CH_2O)_n-R$$

wherein R is H, OH, CH$_3$O and n is about 13 to about 2000. Preferred compounds include polyethylene oxide, polyethylene glycol and methoxy polyethylene glycol.

For purposes of this application, "hot particulate solids" are meant to include particulate solids at temperatures greater than 120° F. The methods of the instant invention can be employed with most high temperature substrates with the capacity for generating fugitive dust emissions. This can include those substrates at temperatures up to 600° F.

The polyethylene oxide compounds employed are commercially available from Union Carbide. Preferred compounds include polyethylene oxide (MW=300,000) available as Polyox ® WSR N750 and polyethylene glycol (MW=3,350) available as Carbowax ® 3350.

These compounds are water-soluble resins that possess high wet tack and adhesion properties. They cure to form a tough, flexible film. These films can be heat-sealed, and form stable agglomerates when a hot particle contacts a polyethylene oxide film.

The polyethylene oxide derivatives, polyethylene glycol and methoxy polyethylene glycol, are relatively nonvolatile and thermally stable. Their physical form ranges from thick liquids to waxy solids. Their primary advantage as dust inhibitors over petroleum oils and waxes is that they possess low toxicity and water solubility.

The polyethylene oxide polymers of the instant invention generally have molecular weights in a range from 100,000 to about 5,000,000. Preferably, this range is from about 100,000 to about 1,000,000. The polyethylene oxide derivatives generally have molecular weights ranging from 200 to about 20,000. Preferably, they range from about 1000 to about 10,000.

The polymers of the instant invention may be applied to the hot substrate by either spraying as a liquid onto the hot substrate or by applying as a foam which incorporates an effective surfactant-based foaming agent. The liquid spray incorporates a suitable solvent for the polymers. Preferably, that solvent is aqueous based.

Aqueous solutions of 0.1 to 25.0% polymer can be sprayed or foamed onto the hot substrate. Concentrations of 0.5 to about 10.0% are preferred. The feed rate of sprayed aqueous solution ranges from about 0.5 to about 10.0 gallons per ton of substrate. Preferably, 1.0 to about 5.0 gallons per ton of substrate are applied.

When applied as a foam, the treatment polymers are fed in a range from about 0.25 to about 5.0 gallons of foamed solution per ton of substrate. Preferred foam feed rates range from about 0.5 to about 2.5 gallons per ton of substrate.

The polymers of the instant invention are effective at providing dust control for a variety of hot substrates. Calcined petroleum coke, cement clinker, steel mill sinter and thermally-dried coal would all be effectively treated by the methods of the present invention.

Additives can be used to improve the stability and hot dust control properties of the polyethylene oxide derivatives. These can include lignosulfonates, wetting agents, foaming agents, solution stabilizers (alcohols), thermal stabilizers (antioxidants) and plasticizing agents. In addition to acting as foaming agents, anionic, nonionic and/or cationic surfactants can be employed to improve the wetting properties of the polyethylene oxide derivatives.

In order to more clearly illustrate this invention, the data set forth below was developed. The following examples are included as being illustrations of the invention and should not be construed as limiting the scope thereof.

EXAMPLES

In order to demonstrate the efficacy of the polyethylene oxide polymers at inhibiting dust emissions, a series of laboratory tests were undertaken. The particulate, dusty material treated was minus ¼ inch, 250 gram subsamples of hot (250° F.) calcined petroleum coke. The polyethylene oxide polymers were tested by themselves as well as comparatively with an oil-based dust inhibitor. All treatments were applied as 1% solutions at a rate of 10% by weight of coke. Relative dustiness was measured hot, after the coke was heated for one hour, and cold, after the coke was heated for one hour and then allowed to cool following the treatment. Relative dustiness (RDI) was measured using a laboratory dust chamber. % dust suppression (% DS) was calculated based on the RDI of treated and untreated samples.

$$\% \text{ dust suppression} = \frac{\text{untreated } RDI - \text{treated } RDI}{\text{untreated } RDI} \times 100\%$$

Test results are reported in Table I.

TABLE I

| | Relative Dustiness | | | |
| | Hot (250° F.) | | Cold (70° F.) | |
| Treatment Agent | RDI | % DS | RDI | % DS |
| --- | --- | --- | --- | --- |
| Control | 25.4 | — | 24.9 | — |
| Oil-based binder[1] | 11.5 | 54.7 | 5.5 | 77.9 |
| Polyethylene Oxide (MW = 300,000)[2] | 1.7 | 93.3 | 1.0 | 96.0 |
| Polyethylene Glycol (MW = 3350)[3] | 5.0 | 80.3 | 8.4 | 66.3 |

[1]available as FlowPro ® 1500
[2]available as Polyox ® WSR N750
[3]available as Carbowax 3350

FlowPro ® 1500 is available from Betz Laboratories, Inc., Trevose, Pa.

As evidenced by Table I, the polymers of the instant invention provide enhanced dust control compared to known hot dust control compounds. This performance indicates that the polyethylene oxide derivatives will be effective on hot substrates.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for reducing the emission of dust from hot particulate substrates having a temperature of about 250° F. comprising contacting the bulk of the particulate substrates with an aqueous solution of polyethylene oxide, said polyethylene oxide having a molecular weight of about 100,000 to about 5,000,000.

2. The method as claimed in claim 1 wherein said polyethylene oxide has a molecular weight of about 100,000 to about 1,000,000.

3. The method as claimed in claim 1 wherein said polyethylene oxide is applied to said substrate by spraying as a liquid.

4. The method as claimed in claim 1 wherein said polyethylene oxide is applied to said substrate as a foam.

5. The-method as claimed in claim 1 wherein said polyethylene oxide is dissolved in solution in said solvent in an amount of 0.1% to 25.0%.

6. The method as claimed in claim 5 wherein said solution is sprayed onto said substrate in an amount from 0.5 to about 10.0 gallons per ton of said substrate.

7. The method as claimed in claim 4 wherein said foam is applied to said substrate in an amount from 0.25 to about 5.0 gallons per ton of said substrate.

8. The method as claimed in claim 1 wherein said substrate is selected from the group consisting of calcined petroleum coke, cement clinker, steel mill sinter and thermally-dried coal.

9. The method as claimed in claim 1 wherein said polyethylene oxide is added to said substrate with anionic, nonionic and/or cationic surfactant foaming agents.

10. The method as claimed in claim 1 wherein said polyethylene oxide is added to said substrates with anionic, nonionic and/or cationic surfactant wetting agents.

11. The method as claimed in claim 1 wherein said polyethylene oxide is added to said substrate with lignosulfonates, alcohols, antioxidants and/or plasticizing agents.

* * * * *